Nov. 29, 1960     O. T. McILVAINE     2,962,628

HEADLIGHT DIMMING SYSTEMS

Filed Dec. 9, 1957     2 Sheets-Sheet 1

INVENTOR

ORAN T. McILVAINE

BY Swecker + Mathis

ATTORNEYS

Nov. 29, 1960   O. T. McILVAINE   2,962,628
HEADLIGHT DIMMING SYSTEMS
Filed Dec. 9, 1957   2 Sheets-Sheet 2

INVENTOR
ORAN T. McILVAINE
BY Swecker + Mathis
ATTORNEYS

United States Patent Office 2,962,628
Patented Nov. 29, 1960

2,962,628

HEADLIGHT DIMMING SYSTEMS

Oran T. McIlvaine, % Photo-Crystals, Inc.,
15 S. 1st St., Geneva, Ill.

Filed Dec. 9, 1957, Ser. No. 701,407

7 Claims. (Cl. 315—83)

This application is a continuation in part of my prior application Serial No. 313,023, now abandoned, filed October 3, 1952.

This invention relates to improvements in headlight dimming systems for automobiles and other vehicles that travel on highways.

Most vehicle headlights, as now employed, are equipped with multiple filaments or separate lamps so arranged as to direct the light beams therefrom onto different portions of a highway in front of a vehicle or to vary the intensity of the beams therefrom. These are usually referred to as high beam or low beam headlights or as bright and dim according to the character thereof. Provision is made ordinarily for switching the electric current from one to the other of the filaments or lamps under the control of the operator, usually by a foot operated switch, to shift the light from the high to the low beam whenever an approaching vehicle is sighted.

It has been proposed heretofore to provide a system for automatically changing the headlights from high to the low beam or from bright to dim in response to light rays from an approaching vehicle to eliminate the necessity for manual shifting thereof and to provide for the actuation of the dimming means without the necessity of attention by the operator. However, it has been found that approaching vehicles do not always maintain the light beams directly toward each other in travelling in opposite directions. Consequently, the direction of the light beams from an approaching vehicle may be directed onto the control means only momentarily which would result in only an instantaneous dimming of the headlights or a fluctuation of the brightness thereof so as to render the device unsatisfactory.

One object of this invention is to overcome these objections to automotive headlight dimming devices and to provide a system which will automatically accomplish the dimming effect of the headlights through a sufficient period of time to enable the vehicles to pass each other on the highway without material fluctuation of the changed beams during the interval.

A further object of the invention is to improve the construction of headlight dimming systems to provide not only for the automatic dimming of the headlights during the approach of a vehicle and in response to the beam of light therefrom but also to provide for a shifting of the headlight dimming means back to the bright or high beam position thereof only after the passage of an interval of time sufficient for the dimmed light of the approaching vehicle to operate the dimmer, thereby maintaining the dimmed headlights in such relation during the passage of the vehicles.

These objects may be accomplished according to one embodiment of the invention by providing a headlight dimming circuit including light responsive means, amplification means, relay means and time delay means connected therewith in such manner as to produce the desired results. The time delay means can be connected in any part of the circuit or with the mechanical relay thereof so that as soon as the proper amount of light is directed onto the light sensitive means the relay will function to dim the headlights of the vehicle to which the system is applied and will hold the headlights thus dimmed without variation for differences in the amount of light, such as dimming, thereafter applied to the light responsive means for such interval of time as may be necessary until the dimmed light of the approaching vehicle will operate the device. When the vehicles have approached close enough, the low beam lights will act through the photocell to maintain the low beam position until the vehicles have passed. The latter function is accomplished by the time delay means referred to which is an important characteristic of this invention.

The invention is illustrated in different embodiments in the accompanying drawings in which.

The invention is shown as applied to a motor vehicle headlight circuit modified to include provision for automatic dimming of the headlights. It will be understood, however, that any suitable wiring diagram may be used in connection therewith as well as customary manual controls, fuses, etc. such as are ordinarily provided.

Figure 1:
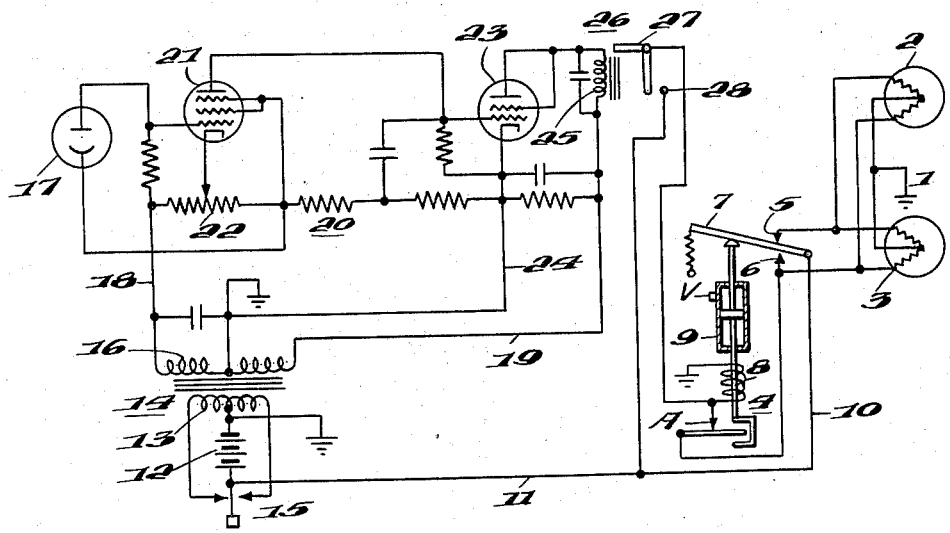
Fig. 1 is a diagrammatic view showing a photo-electric amplifier circuit for controlling the headlights.

Referring to the wiring diagram in Fig. 1, the headlights of the vehicle are illustrated generally by the numeral 1. Each of the headlights 1 is shown of the type which comprises two prefocused filaments adapted respectively for bright and dim illumination or for high and low beam illumination as variously referred to and according to the character of the headlights used in the vehicle. The high and low beams or the bright and dim filaments are connected in parallel in the respective lamps and in circuits generally designated respectively as 2 and 3, each of which is grounded at one side while the opposite side is connected with a relay generally designated at 4. The relay 4 includes contacts 5 and 6 connected respectively with the high and low beam circuits 2 and 3. These contacts 5 and 6 are in position to be engaged by a spring biased armature 7 of the relay 4 which normally is in engagement with the contact 5 of the high beam circuit 2 but when the armature is attracted by the energizing of the coil 8 it is drawn downward into engagement with the contact 6.

The relay 4 preferably includes some time delay means which is illustrated in this embodiment as including a dash pot generally indicated at 9 having a perforated cylinder within which a piston is movably mounted which piston is shown as connected with the armature 7. Valve means V in the wall of the cylinder will allow admittance of the air only slowly, thereby allowing slow movement of the armature 7 in the one direction, in this instance, downward toward the contact 6 as hereinafter described. Valve means V allows the air to be expelled rapidly, however, and the return motion of the armature is immediate.

The armature 7 is shown as connected through conductors 10 and 11 with one side of a battery 12 or other source of potential, usually the storage battery of the motor vehicle. The opposite side of the battery is connected with the primary 13 of a power transformer 14, and through a vibrator 15 which is the usual vibrator ordinarily provided in the radio set of a motor vehicle.

The transformer 14 has a secondary 16 that will deliver 250 volts A.C. to the amplifier and control circuit as herein described. This secondary has a center tap which is grounded as shown. Other voltages can be used depending upon the types of tubes employed and the power circuit connected therewith.

The control circuit includes light responsive means in the form of a suitable cell generally indicated at 17. This light sensitive means can be of the photo-electric, photo-emissive, photo-conductive, or photo-generative type. Moreover, the light responsive means should be mounted in a suitable exposed portion on the vehicle in a place where the light from an approaching vehicle will fall thereon, such as on the front fender or grill or on the top adjacent to the windshield.

One side of the light sensitive cell 17 is connected through a conductor 18 with one side of the transformer secondary 16, the opposite side of which transformer secondary has a conductor 19 connected therewith and extending to a control relay as herein after described. The opposite side of the light responsive cell 17 is connected with a resistance circuit generally indicated at 20 which is in shunt with the transformer secondary 16 and includes a series of resistances as shown in Fig. 1.

The output from the light sensitive cell 17 is connected with the control grid of a power amplifier tube generally indicated at 21, the cathode of which is variably connected with a resistance 22 in the resistance circuit 20 to regulate the potential of this tube.

The output from the plate circuit of the tube 21 is connected with the control grid of a power tube 23. The cathode of the tube 23 is connected in turn through a conductor 24 with the center tap of the secondary 16.

The plate circuit of the tube 23 is connected with one side of a relay coil 25 of a control relay generally indicated at 26, the opposite side of which coil is connected with the transformer secondary 16 through conductor 19.

Control relay 26 has an armature 27 arranged to be moved in response to energizing of the coil 25 to engage a contact 28 normally open when the circuit is closed through the bright filaments 2.

The circuit illustrated is not shown as including the usual manually controlled means for switching the headlights to high and low beams but it will be understood that such switching means may be employed if desired in the headlight circuit, as well as the foot operated switch if desired. The use of such switches and other features customarily employed in the circuit may be used as usual so as to control thereby the headlights in the usual manner as well as to provide for automatic control thereof as herein described.

During operation of the vehicle with high beam filaments 2 energized, the relay 26 will be deenergized and the contacts will be open at 28.

When an approaching vehicle directs light onto photocell 17, the relay 26 is energized, closing the circuit at 28 through the coil 8 of the relay 4, thereby pulling down the armature 7, breaking the circuit of the high beam lights at 5 and closing the circuit of the low beam lights at 6.

As soon as the armature 7 closes the contact 6, a circuit is completed through a holding switch A, thence through the coil 8 to ground, thereby holding the coil 8 energized until the solenoid has reached the limit of its lowering movement when this switch A will be opened by the solenoid. This prevents opening and closing of the circuit through coil 8 due to variations in light intensity on the photocell.

When the vehicles approach close enough so that the low beam lights will act through the photocell to energize the relay 26, this will maintain the coil energized through the contacts 28, and the headlights will remain dimmed until the vehicles have passed. Then, through deenergizing of the relay 26, this circuit will be broken at 28 and the solenoid will be returned immediately by spring pressure to its raised position, thus breaking the low beam headlight circuit at 6 and closing the circuit at 5 to the high beam lights.

The time delay means connected with the system and exemplified by the dash pot 9 prevents the automatic return of the energizing of the headlights from dim to bright until after an elapsed time sufficient for the meeting vehicles to close the gap sufficiently for the dimmed light to hold in a dimmed position. Usually this will be a time delay from about 3 to 15 seconds depending upon the type of country and driving conditions. In a mountainous country or where the roads are winding, a shorter time delay may be provided than is needed in open flat country.

In either event the interval of time during which the light from an approaching vehicle falls upon the light sensitive cell 17 usually is only momentary. By reason of a shifting or turning of the relative positions of the vehicles this light may pass back and forth over the light sensitive cell many times before they meet. The provision of time delay means prevents alternate shifting of the lights from bright to dim and back again during such intervals and maintains the headlights energized for dim or low beam illumination until after an elapsed time sufficient for the vehicles to get close enough for the dimmed beam to hold.

In the illustrated embodiment, the dash-pot 9 is of the fluid air type in which air is admitted slowly to the cylinder as the armature 7 is moved from the position shown in Fig. 1 to the opposite position as engaged with contact 6. Adjustment of valve means V will vary the length of time delay, as for instance, from about 3 seconds to about 15 seconds, even though the light of an approaching vehicle should be removed from the light sensitive cell.

However, when the coil 8 is de-energized air is expelled from the cylinder very rapidly through the valve means V so as to return the armature 7 to its normal position in engagement with contact 5.

The time delay means can be connected in the light sensitive part of the circuit, the amplifying part of the circuit or in the mechanical relay as shown. In any event provision should be made whereby the energizing circuit of the headlights will be held in changed position for an elapsed period of time before shifting to its opposite position. If the time delay be incorporated in the electrical part of the circuit it may consist merely of a condenser or resistance network, in the grid circuit (as is well known in the art), providing storage of electrons for a period of time sufficient to maintain the tubes conducting and the control relay in an energized condition for the desired delay period. A thermal unit can be used in place of the dash pot, as shown, or other means which will accomplish the desired end.

The relay 26 can be used to control the headlight circuit directly if the contacts are heavy enough to carry the required current. However, it is preferred that a separate relay, as indicated at 4, be employed for this purpose because it can be made larger and preferably mounted in a different part of the vehicle such as under the hood near the light circuits to avoid an appreciable drop in voltage.

The armature 7 and contacts 5 and 6 are preferably of a type conventionally known as "make before break" which means that in switching from contact 5 to 6, or vice versa, the one circuit is not broken until the second circuit is completed. This prevents the headlights from being in a darkened condition at any point during the relay operation.

Figure 5:
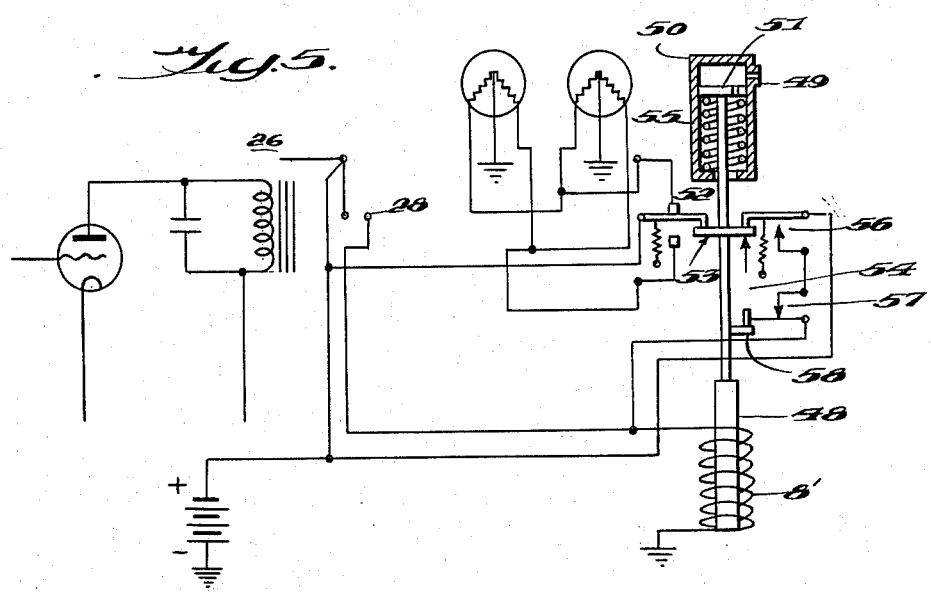
Fig. 5 is a diagrammatic view of a modified circuit.

The modification shown in Fig. 5 illustrates the use of a dash-pot of alternate construction as compared with that shown in Fig. 1. In this form, the operation of the relay 26, as described above, causes the contact 28 of the light source control circuit to be closed, thereby supplying current to the coil 8' of the solenoid. The energizing of the solenoid coil 8' starts the downward pull of the dash-pot armature 48 against the air let in slowly through an adjustable air valve 49 into a dash-pot cylinder 50.

As soon as the piston 51 of the dash-pot starts to move, the contact 5 is opened and the contact 6 is closed by the contact member 52 being released by the shoulder 53 on the armature 48. This action switches the head lights immediately from bright to dim or low beam. The spring 55 which is compressed during the downward stroke of the piston 51 will return the piston by fast action.

Upon downward movement of the armature 48, a switch 56 is closed, thereby locking the solenoid 8′ in the circuit for the necessary time delay. This will allow the contact 28 to be opened without changing the lights back to bright or high beam.

As soon as the piston reaches the bottom of its stroke, the stop member 54 opens a switch 57, thereby breaking the holding circuit for the solenoid coil and thus allowing the lights to return to the bright position whenever the circuit is opened at 28. As soon as the car has passed, the contact 28 opens causing the solenoid to release and the parts are returned to the positions shown in Fig. 5 by the action of the spring 55. This in turn causes a closing of the switch 57 by a stop member 58 on the armature 48.

Any suitable or desired solenoid may be used for this purpose, providing the action as described above.

Figure 2:
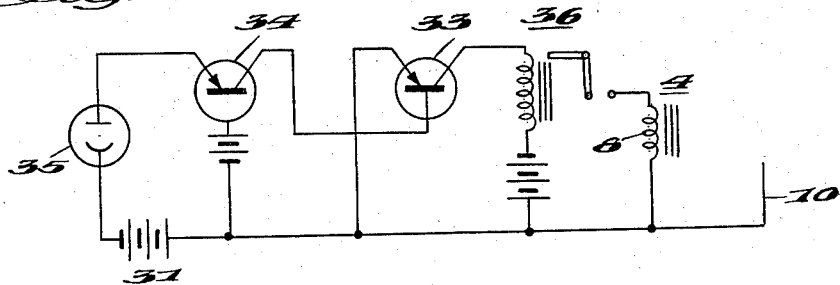
Fig. 2 is a similar view showing a transistor circuit as the power means for the headlight circuit.

A modified circuit is shown in Fig. 2 which is operated from the 6-volt battery 31 connected at one side with a transistor 33. A second transistor is shown at 34 connected in the circuit of a light sensitive cell 35. A control relay is shown at 36 for controlling the relay circuit to the main light control relay 4.

The control relay 36 corresponds with the relay 26 in Fig. 1 and controls a circuit to the light controlling relay 4, as indicated in Fig. 1. This portion of the circuit operates substantially as described above in connection with Fig. 1.

Figure 3:
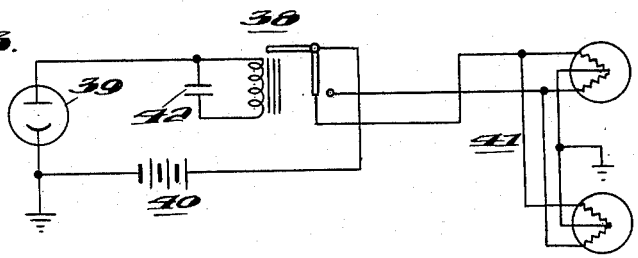
Figs. 3 and 4 are similar views showing other modified forms of the transistor circuits.

It is also possible to use a single control relay, as shown at 38 in Fig. 3, which is connected with a suitable light sensitive cell 39, such as a semi-conductor cell, the output of which will operate the coil of the relay 38 to connect a source of current such as a battery 40 with a high beam or low beam circuit for the headlights, the light circuit being shown generally at 41 in Fig. 3. In this case the control relay is operated directly by the light sensitive cell. This is entirely possible inasmuch as semi-conductor cells of the type of germanium, silicon and the like will have a milliampere output instead of microampere output, as has been usual in most commercial photocells. A sensitive relay such as that designated at 38 will operate on one milliampere and will be sufficient to connect the source of current with the lights.

Figure 4:
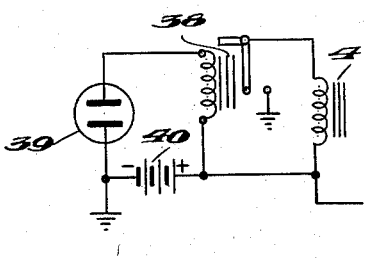

If preferred, the control relay may be connected with a primary relay 4 functioning in the manner described above in connection with Fig. 1, as shown in Fig. 4. The operation of the latter circuit is substantially the same as described in connection with Fig. 3, while the control of the light circuit by the primary relay 4 is the same as that described above in connection with Fig. 1.

The electrical time delay consisting of a condenser and resistor may be used in place of the time delay means shown at 9 as described above, one example of which is shown in Fig. 3 comprising a condenser 42 connected across the coil of the relay 38. The delay can also be connected in the control circuit of the transistors as is well known to those skilled in the art.

This system will operate on the same principle described above and may include the time delay means in any suitable part thereof such as the electrical circuit as described.

Figure 6:
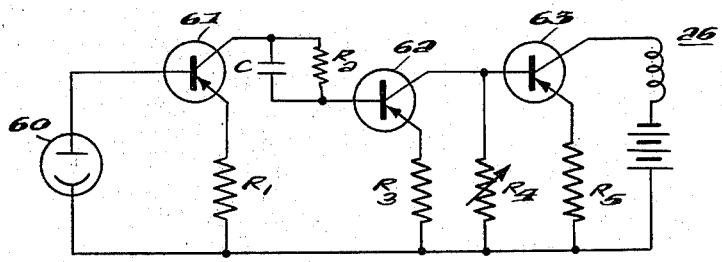
Figs. 6 and 7 are diagrammatic views showing still other modified forms of the transistor circuits.
Figure 7:
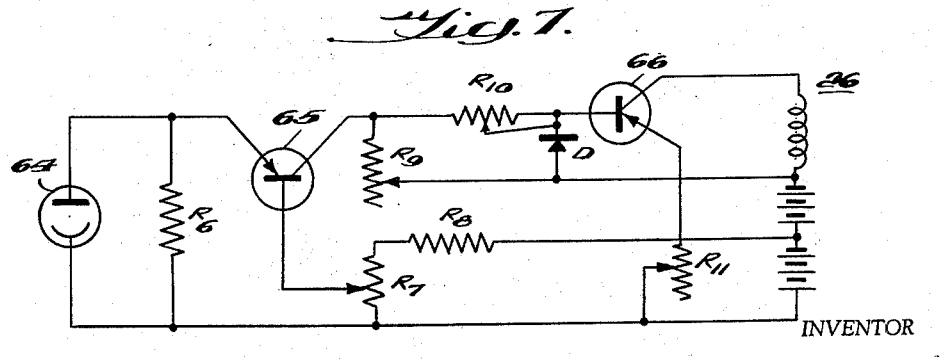

Fig. 6 illustrates an alternate transistor circuit which may be substituted for the circuit shown in Fig. 2. In Fig. 6 a low resistance photo-electric cell 60 serves as the energizing means for three series—coupled transistors 61, 62 and 63, which in turn control the actuation of relay 26. The transistors are of the P-type conductivity and typical values of the circuit parameters are as follows:

$R_1=56\Omega$      $R_4—5,000\Omega$
$R_2=100,000\Omega$      $R_5=100\Omega$
$R_3=68\Omega$      $C=10 \mu fd.$ Fig. 7 shows still another transistor embodiment which has provision for temperature compensation. While there are many advantages to be incurred from the use of transistors, they are known to be highly sensitive to changes in temperature. These temperature changes produce variations in the bias voltage between the emitter and base electrodes resulting in unstable, and therefore unreliable, operation.

The circuit of Fig. 7 comprises a low resistance photo-electric cell 64 feeding into two series connected P-type transistors 65 and 66, which are arranged to control the operation of relay 26. The temperature responsive device which provides compensation for variations in ambient temperature is the diode D.

Diode D may be of any suitable material such as germanium or silicon, but is preferably chosen to be of the same material as the transistor with which it is associated so that the temperature characteristics of the two are substantially the same. When connected as shown in Fig. 7, the diode D compensates for any changes in the bias voltage circuit of transistor 66 and thereby stabilizes the operation of the circuit.

Typical values of the circuit parameters are given as follows:

$R_6=100\Omega$      $R_9=15,000\Omega$
$R_7=100\Omega$      $R_{10}=1,000\Omega$
$R_8=1,000\Omega$      $R_{11}=500\Omega$ The circuits of the Figs. 6 and 7 may include time delay means in any suitable part thereof or may be connected to operate a mechanical delay means as described in connection with Figs. 1 and 5.

While the invention is illustrated and described in certain embodiments it is recognized that variations and changes may be made therein without departing from the invention as set forth in the claims.

I claim:

1. In an automotive vehicle headlight control system, the combination of a dim circuit, a bright circuit, a switch having contact means movable to and from positions alternately closing said circuits, a light responsive device in position for action thereon by light from an approaching vehicle, means actuated by said device in response to light thrown from said approaching vehicle for causing closing of the dim circuit by said switch contact means, time delay means operative after the closing of the dim circuit by the first-mentioned means for holding the switch contact means in dim position for a predetermined elapsed time during which the vehicles are still approaching said time delay means being capable of trigger action for restoring the bright circuit at the termination of said predetermined elapsed time, and said control system operating to withhold said trigger action until said approaching vehicle is removed from said light responsive device.

2. In an automotive vehicle headlight control system, the combination of a dim circuit, a bright circuit, a switch having contact means movable to and from positions alternately closing said circuits, a light responsive device in position for action thereon by light from an approaching vehicle, a relay controlling said switch, means actuated by said light responsive device in response to light thereon from said approaching vehicle for energizing said relay to close the dim circuit by the switch contact means, time delays means operative after the closing of the dim circuit by the relay actuated switch for holding the switch contact means in dim position for a predetermined elapsed time during which the vehicles are approaching, said time delay means being capable of trigger action for restoring the bright circuit at the termination of said predetermined elapsed time, and said control system operating to withhold said trigger action until said approaching vehicle is removed from said light responsive device.

3. In an automotive vehicle headlight control system, the combination of a dim circuit, a bright circuit, a switch having contact means movable to and from positions alternately closing said circuits, means for causing said movable contact means to be urged normally into a position to close said bright circuit, a first relay for moving said movable contact means from a first position closing the bright circuit into a second position to close said dim circuit, a second relay for controlling said first relay, a photo-electric cell, a power amplifying circuit connecting said photo-electric cell with said second relay so as to cause actuation of said first relay when light of at least a predetermined intensity falls on said photo-electric cell, a source of direct current for said first relay and said dim and bright circuits, and time delay means connected with the contact means for holding the contact means in dim position for a predetermined elapsed time, said time delay means being capable of trigger action for restoring the bright circuit at the termination of said predetermined elapsed time, and said control system operating to withhold said trigger action until said approaching vehicle is removed from said light responsive device after which the first relay is actuated by the removal of the light from the photo-electric cell so as to close the bright circuit.

4. In an automotive vehicle headlight control system, the combination of a dim circuit, a bright circuit, a switch having contact means movable to and from positions alternately closing said circuits, a light responsive device in position for action theron by light from an approaching vehicle, means actuated by said device in response to light from said approaching vehicle for causing the closing of the dim circuit by said switch contact means, time delay means operative after the closing of the dim circuit by the first-mentioned means for holding the switch contact means in dim position for a predetermined elapsed time during which the vehicles are still approaching, said time delay means being capable of trigger action for restoring the bright circuit at the termination of said predetermined elapsed time, and said control system operating to withhold said trigger action until said approaching vehicle is removed from said light responsive device, means for closing said bright circuit by said switch contact means when the light from said approaching vehicle is removed from said light responsive device, said time delay means acting to cause the delay period to expire during the approach of the vehicles whereby the lights are restored to brightness immediately upon passing of the vehicle.

5. In an automotive vehicle headlight control system, the combination of a dim circuit, a bright circuit, a switch having contact means movable to and from positions alternately closing said circuits, a light responsive device in position for action thereon by light from an approaching vehicle, means actuated by said device in response to light from said approaching vehicle for causing closing of the dim circuit by said switch contact means, time delay means operative after the closing of the dim circuit by the first-mentioned means for holding the switch contact means in dim position for a predetermined elapsed time during which the vehicles are still approaching, said time delay means comprising a dash-pot connected with the switch contact means and including means for slow movement to dimming position and quick return to bright position after the removal of the light from the approaching vehicle.

6. In a control system for one or more lamps having a bright and a dim filament in each, a source of electrical power, switching means connected to the source of power and to the bright and dim filaments to energize the same alternately, light responsive means energized by light from an approaching vehicle for controlling said switching means, time delay means operative after the connection of the source of power with the dim filament for holding said power connection for a predetermined elapsed time, and means for connecting the source of power with the bright filament immediately after the elapse of said time interval and the deenergizing of the light responsive means by the light from an approaching vehicle.

7. In a control system for one or more lamps having a bright and a dim filament in each, a source of electrical power, switching means connected to the source of power and to the bright and dim filaments to energize the same alternately, light responsive means energized by light from an approaching vehicle for controlling said switching means, time delay means operative after the connection of the source of power with the dim filament for holding said power connection for a constantly maintained predetermined elapsed time, and means for connecting the source of power with the bright filament immediately after the elapse of said time interval and the deenergizing of the light responsive means by the light from an approaching vehicle.

References Cited in the file of this patent

UNITED STATES PATENTS

| | | |
|---|---|---|
| 2,476,382 | Pillus | July 19, 1949 |
| 2,476,389 | Schmidt | July 19, 1949 |
| 2,493,307 | Moore et al. | Jan. 3, 1950 |
| 2,573,627 | Vanderlip | Oct. 30, 1951 |
| 2,786,963 | Vogt | Mar. 26, 1957 |
| 2,786,964 | De Witt et al. | Mar. 26, 1957 |